United States Patent
Gohr et al.

(10) Patent No.: US 9,367,064 B2
(45) Date of Patent: Jun. 14, 2016

(54) METHOD AND VIEWER FOR A CAUSE AND EFFECT MATRIX IN A SAFETY SYSTEM

(71) Applicant: ABB AS, Billingstad (NO)

(72) Inventors: Katharina Gohr, Weinheim (DE); Phillip Weemes, Oslo (NO)

(73) Assignee: ABB AS, Billingstad (NO)

( * ) Notice: Subject to any disclaimer, the term of this patent is extended or adjusted under 35 U.S.C. 154(b) by 620 days.

(21) Appl. No.: 13/750,383

(22) Filed: Jan. 25, 2013

(65) Prior Publication Data
US 2013/0138227 A1 May 30, 2013

Related U.S. Application Data

(63) Continuation of application No. PCT/EP2010/060814, filed on Jul. 26, 2010.

(51) Int. Cl.
*G05B 23/02* (2006.01)
*G05B 9/02* (2006.01)

(52) U.S. Cl.
CPC ........... *G05B 23/027* (2013.01); *G05B 9/02* (2013.01); *G05B 23/0286* (2013.01); *G05B 2219/14006* (2013.01); *G05B 2219/24024* (2013.01); *G05B 2219/25118* (2013.01)

(58) Field of Classification Search
CPC .... G05B 23/027; G05B 9/02; G05B 23/0286; G05B 2219/14006; G05B 2219/24024; G05B 19/25118
See application file for complete search history.

(56) References Cited

U.S. PATENT DOCUMENTS

| | | | | |
|---|---|---|---|---|
| 5,361,198 A * | 11/1994 | Harmon | ........... | G05B 9/03 376/216 |
| 6,369,836 B1 * | 4/2002 | Larson | ........... | G05B 19/0426 715/763 |
| 6,421,571 B1 * | 7/2002 | Spriggs | ........... | G05B 15/02 345/629 |
| 6,448,982 B1 * | 9/2002 | Klapper | ........... | G05B 19/4189 345/440 |
| 6,898,468 B2 * | 5/2005 | Ott | ........... | G05B 9/02 700/21 |
| 7,212,952 B2 * | 5/2007 | Watanabe | ........... | G05B 23/0281 702/182 |

(Continued)

OTHER PUBLICATIONS

Siemens Energy & Automation Inc.: "Configuration Guide Safety Matrix Version 2.00 for QUADLOG Safety PLC"; Manual; 2002; 98 pages.

(Continued)

*Primary Examiner* — Ramesh Patel
(74) *Attorney, Agent, or Firm* — Whitmyer IP Group LLC (57) ABSTRACT

A method in an industrial safety system for controlling a process or equipment. An industrial safety system comprises components with safety devices wherein the safety system enables signals to be generated as a result of an event or alarm. The method and system uses a cause and effect matrix with automated links between each event or alarm and an effect or an action to be taken upon receipt of the event or alarm signal due to the event. In an online view of the improved cause and effect matrix, at least one effect cell of the cause and effect matrix is arranged with a first executable link for a device represented by the at least one effect cell.

20 Claims, 6 Drawing Sheets

(56) References Cited

U.S. PATENT DOCUMENTS

| | | | |
|---|---|---|---|
| 7,680,546 B2* | 3/2010 | Gilbert | G05B 19/0426 700/17 |
| 2002/0198907 A1* | 12/2002 | Klapper | G05B 19/4189 715/213 |
| 2004/0193290 A1* | 9/2004 | Ott | G05B 9/02 700/18 |
| 2004/0236714 A1* | 11/2004 | Eisenberger | G06F 17/30528 |
| 2005/0203696 A1* | 9/2005 | Watanabe | G05B 23/0281 701/114 |
| 2007/0276514 A1* | 11/2007 | Martinez | G05B 9/02 700/80 |
| 2008/0082295 A1* | 4/2008 | Kant | G05B 23/021 702/179 |
| 2008/0255880 A1* | 10/2008 | Beller | G06F 19/3487 705/3 |
| 2013/0131843 A1* | 5/2013 | Gohr | G05B 19/0421 700/80 |

OTHER PUBLICATIONS

International Preliminary Report on Patentability Application No. PCT/EP2010/060814 Completed: Nov. 27, 2012 15 pages.
International Search Report and Written Opinion of the International Searching Authority Application No. PCT/EP2010/060814 Completed: Jul. 4, 2011; Mailing Date: Jul. 26, 2011 19 pages.
Siemens Energy & Automation Inc.: "QUADLOG Safety Matrix"; Product Brochure; 2004; 5 pages.
Written Opinion of the International Preliminary Examining Authority Application No. PCT/EP2010/060814 Mailing Date: Oct. 12, 2012 6 pages.

* cited by examiner

METHOD AND VIEWER FOR A CAUSE AND EFFECT MATRIX IN A SAFETY SYSTEM

FIELD OF THE INVENTION

The present invention relates to a method in an industrial safety system for controlling a process or equipment. The industrial safety system comprises components with inputs and safety devices that enable signals to be generated as a result of an event or alarm. A Cause and Effect matrix is used to generate code for safety controllers to control safety devices. The Cause and Effect matrix online viewer of the present invention is particularly suitable for providing improved monitoring and control over safety devices in an industrial system enabling a user to monitor and control directly from the cause and effect matrix interface online view.

BACKGROUND OF THE INVENTION

An industrial process such as an installation for extraction or production of oil and gas products has a physical implementation comprising components such as devices and apparatuses for operation, control, regulation and protection of the process. The industrial process also comprises systems for functionality, control and supervision. This results in a complex combination of system and components. In the process industry contexts it is necessary to protect the humans, or an individual environment, process systems, subsystems and/or components. As part of the functions of the elements in the system, measurements for parameters such as currents, voltages, phases, temperatures and so on are made substantially continuously and may result in different safety scenarios up to and even including a plant shut-down.

The safety-related functions of the industrial system are performed by a dedicated safety system with input from safety devices and safeguarding outputs. Safety systems have been developed for the purpose of enabling safeguarding actions in reaction to the safety events. Safety systems in the process industry have a general criterion of engineering with strong emphasis on quality and verification. Such systems are typically not fully standard but are often purpose-built and usually include various and different devices and/or subsystems, software and communication protocols.

A safety system must perform very reliably, even more reliably than the process systems they protect; this means that a different standard of engineering must be used, with stronger emphasis on quality and verification. This approach is especially important if a customer is seeking Safety Integrity Level (SIL) classification of their safety system that is according to the standards relevant for that industry or branch, e.g. IEC-61508 Functional safety of electrical/electronic/programmable electronic safety-related systems, IEC/TR3 61510 RMBK nuclear reactors-Proposals for instrumentation and control, IEC-61511 Functional safety-Safety instrumented systems for the process industry sector.

Figure 3:
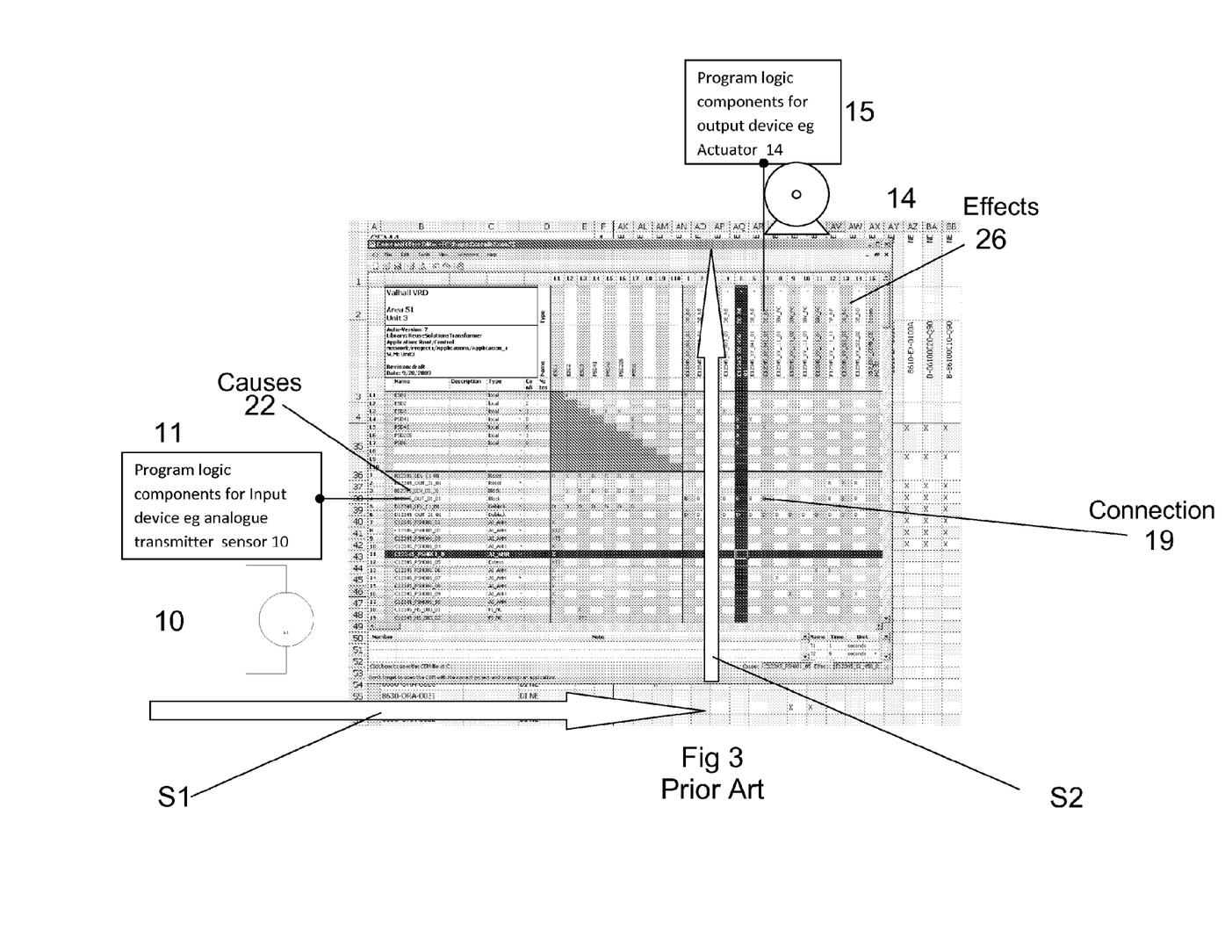
FIG. 3 (Prior Art) is a known type of cause and effect matrix.

U.S. Pat. No. 5,361,198 entitled Compact work station control room and assigned to Combustion Engineering describes a concept including a safety system, comprising software, displays for input, a general safety system and hand-coded functions. The patent application US2007/276514 entitled "Method In A Safety System For Controlling A Process Or Equipment", and assigned to ABB, describes an industrial safety system (ISS) and methods for controlling a process or equipment. The industrial safety system includes components with safety devices and enables signals to be generated as a result of an event or alarm. An automated link is created between the event or alarm and an action to be taken upon receipt of the event or alarm signal due to the event. This is done using in part a display or HMI associated with selection means for input etc. The structure of the system is to create a grid/matrix of related objects. The grid/matrix is a system of rows and columns, an interface and type of application often referred to as a Cause and Effect matrix or diagram. The matrix is often populated by manually entering information, or importing one or more signal lists and/or cause and effect information in a worksheet or calculation sheet format, into a tool for editing a Cause and Effect matrix. FIG. 3 (Prior Art) shows a cause and effect matrix. The graphic user interface of the cause and effect matrix editor shows Causes 22 arranged in horizontal rows and Effects 26 arranged in vertical columns. A sensor device 10 such as a level sensor provides an input signal, which is handled as a Cause. This is represented in the cause and effect matrix by a program logic component, which is a portion of control code, usually a standardized or logic component held e.g. in a library, which is commonly in the form of a function block, or control module or similar. This form of control code is often referred to as an intermediate code, as it is computer program code which is not yet in a compiled form.

During an engineering phase configuration is carried out with the Cause and Effect matrix editor to make a software connection 19 between a Cause and an Effect. This has the result of making a software connection between an input signal such as from level sensor 10 being "software connected" to an output signal to an effect actuator 14 for the planned event and safeguarding action. This may be thought of as resulting in the software connection of a signal path S1 from an input device to a signal path S2 to an output device (actuator, motor) providing the action or event. When the matrix has been configured the Cause and Effect matrix editor then converts the "software connected" for the program logic components of each cause and the program logic components of each effect and generates an IEC61311-3 control code from the matrix, usually in intermediate code. This IEC61311-3 control code may then be compiled into executable computer code and downloaded into the memory of a safety controller of a safety system.

For the emergency and process shutdown logic, shutdown levels are used. A shutdown level is a group of causes and effects, grouped together either by process sections or site areas. Process section means a specific part of the process and site area means a specific location of a site, e.g. a Hazardous area, a Non-hazardous area. A typical shutdown level will have a number of causes connected and will trip the effects connected to it. Ideally, all causes and effects are connected to exactly one shutdown level. All causes and effects should be connected to a shutdown level. For the Fire & Gas IEC61311-3 logic, fire areas are used. A fire area is for the fire and gas logic the equivalent to a shutdown level for the emergency and process shutdown logic.

These shutdown levels and Fire and Gas areas are normally implemented manually within the control code. They are often part of known Cause and Effect diagram systems and however, although the control code is often generated automatically from the Cause and Effect diagram, the shutdown levels are normally not included, so that shutdown levels have to be added to the control code manually.

When the control code has been designed or generated by a cause and effect editor or builder tool and the compiled code is running in a controller the cause and effect matrix may be examined by operators or other users to examine the system and relationships between the inputs (causes) and the alarms and outputs (or effects). In some systems, the operator can see or otherwise get access to the values of the causes or effects in an online mode or online view of the cause and effect matrix. This assists the operator to investigate an event or alarm. However, to operate or configure a device i.e. an output device such as actuator or motor of an effect in the cause and effect matrix operators and other users have to navigate through the safety system or industrial control system to select the device which can be a lengthy and time-consuming process. In cases when time is limited the time taken to investigate whether a device has tripped may be critical and if the time is excessive it could lead to a partial or full process shutdown.

SUMMARY OF THE INVENTION

The aim of the present invention is to provide an improved method for controlling a safety system that provides a solution to one or more of the above described problems.

According to a first aspect of the invention a method is provided in an industrial safety system for controlling a process or equipment, said industrial safety system comprising components with inputs and safety devices and wherein said safety system uses control code designed or generated by a cause and effect matrix with an automated link between each event or alarm and an effect or an action to be taken upon receipt of said event or alarm signal due to the event in one or more safety controllers, and wherein an online viewer provides an on-line view of said cause and effect matrix, the method comprising in particular providing at least one effect cell in an on-line view of the cause and effect matrix with a first control arranged to receive user input and provide an executable link for opening and controlling a device linked to the at least one effect cell.

According to an embodiment of the invention a method is provided in an industrial safety system for controlling a process or equipment, comprising one or more safety controllers running a control code generated by a cause and effect matrix with an automated link between each event or alarm and an effect or an action to be taken upon receipt of said event or alarm signal due to the event in the one or more safety controllers, and wherein an online viewer provides an on-line view of said cause and effect matrix, at least one effect cell in an on-line view of the cause and effect matrix with a first control arranged to receive user input and that the first control is further arranged with an alternative executable link to open and operate the device linked to the at least one effect cell.

According to another embodiment of the invention a method is provided in an industrial safety system for controlling a process or equipment, comprising one or more safety controllers running a control code generated by a cause and effect matrix with an automated link between each event or alarm and an effect or an action to be taken upon receipt of said event or alarm signal due to the event in the one or more safety controllers, and wherein an online viewer provides an on-line view of said cause and effect matrix, at least one effect cell in an on-line view of the cause and effect matrix with a first control arranged to receive user input wherein the first control is further arranged to display a first visual indicator superimposed on or beside the at least one effect cell linked to the device in the case where the device has tripped. By this means the operator is informed immediately without any action necessary by the operator that a device in the effect cell so-marked has tripped.

According to another, further embodiment of the invention a method is provided for controlling a process or equipment, using control code base on a cause and effect matrix with an automated link between each event or alarm and an effect or an action to be taken upon receipt of said event or alarm signal due to the event in the one or more safety controllers, and wherein an online viewer provides an on-line view of said cause and effect matrix, and at least one effect cell in an on-line view of the cause and effect matrix with a first control arranged to receive user input and the further arranged to display a second visual indicator superimposed on the cause and effect matrix on or beside an effect cell in the case where the at least one effect cell has received a signal to trip a device linked to the at least one effect cell but has not tripped. With this inventive feature the operator is informed via the on-line view of a cause and effect matrix, immediately and without any action needed by the operator, that a device in the effect cell so-marked has received a signal to set a trip, and has not tripped. At the same time, no additional, unrequested information has been displayed to the operator via the online view.

According to an embodiment of the invention a method is provided in an industrial safety system for controlling a process or equipment, comprising one or more safety controllers running a control code generated by a cause and effect matrix with an automated link between each event or alarm and an effect or an action to be taken upon receipt of said event or alarm signal due to the event in the one or more safety controllers, and wherein an online viewer provides an on-line view of said cause and effect matrix, at least one effect cell in an on-line view of the cause and effect matrix with a first control and by running a process for determining which cause or causes have lead to said event or alarm for the device that received a signal to trip, and displaying a third visual indicator indicating the one or more causes on the cause and effect matrix so determined to have lead to the signal to trip. Thus one or more possible causes are found directly without leaving the on-line view of the matrix.

According to another embodiment of the invention a method is provided in an industrial safety system for controlling a process or equipment, comprising one or more safety controllers running a control code generated by a cause and effect matrix with an automated link between each event or alarm and an effect or an action to be taken upon receipt of said event or alarm signal due to the event in the one or more safety controllers, and wherein an online viewer provides an on-line view of said cause and effect matrix, at least one effect cell in an on-line view of the cause and effect matrix with a first control arranged to receive user input and providing a second control linked to the at least one effect cell of the cause and effect matrix which is arranged to receive input and open and display a faceplate for controlling the device. In another development the first control may be further arranged to receive user input and open and display a faceplate for a selected cause cell or a shutdown level. The operator can open a faceplate for a device linked to an effect cell of interest by directly activating the effect cell on the on-line view, and without leaving the matrix in order to navigate through a safety system to find the device in a process diagram.

In another embodiment the faceplate of a device that has tripped may display another first visual indicator on the faceplate showing immediately that the device has tripped. In a further development another, second visual indicator is arranged on the faceplate for indicating when a trip has been set or signaled but has not tripped. In yet another development one or more live process values of the device are displayed on the faceplate.

According to an embodiment of the invention a method is provided in an industrial safety system for controlling a process or equipment, comprising one or more safety controllers running a control code generated by a cause and effect matrix with an automated link between each event or alarm and an effect or an action to be taken upon receipt of said event or alarm signal due to the event in the one or more safety controllers, and wherein an online viewer provides an on-line view of said cause and effect matrix, at least one effect cell in an on-line view of the cause and effect matrix with a first control arranged to receive user input and open and display a faceplate for a selected cause cell or a shutdown level. Thus an operator may monitor, configure or control an instrument or process equipment of a cause cell or a shutdown level of interest starting from the context of the cause and effect matrix as displayed in the online view.

In a first aspect of the invention an online viewer of the cause and effect matrix displays live information about the signals and devices included in the cause and effect matrix. The cause and effect matrix as constructed by the cause and effect editor may be viewed in the on-line view, which is to say, that when the process objects in the matrix, each tag name, is connected to its live (current) data. For example all process objects (or tag names) present in the cause and effect matrix may subscribe to a live data subscription such as an OPC (Object linking and embedding (OLE) for Process Control) service or web service or similar data subscription to provide live, current data, to receive live values of each parameter measured or calculated each process object. If one or more devices included in the displayed matrix have tripped, then the cause and effect matrix displayed indicates those devices by means of a visual, graphic marker or indicator. The indicator displayed superimposed over the relevant effect cell may be dynamic, such as a blinking signal light, a blinking shading effect, or static, such as a colored highlight or text-numeric label, or similar. Activation of the marked device in the cause and effect matrix online view by any input means such as a left or right mouse-click on mark or indicator will open a faceplate for the device. Thus the operator may use the faceplate to operate the device linked to the effect directly from the online view of the matrix. This could be to start or jog a motor, open/close a valve as well as to adjust a set point or other configuration.

In addition a mouse roll-over function may be used to show a label for a device linked to the effect cell which has tripped. Additional features such as allowing left or right click on the roll-over label as an alternative way bring up a faceplate or to bring up all causes linked to the effect to which the tripped device is associated may also be arranged. As described above, the online view of the cause and effect matrix may be configured so that an input such as a left or right mouse-click on a selected cause, effect or shutdown level cell in the cause and effect matrix results in opening a faceplate for the device linked to the cause, effect or level cell. By this means it is possible to operate the devices directly from the live-view of the cause and effect matrix. This is done by means of an executable link to retrieve or generate, on receiving input, a faceplate for each device associated with the cause, effect or shutdown level (or Fire Area) cell. The same feature may also be provided to bring up a faceplate to operate a sensor or an instrument linked to a selected cause cell.

On the live-view cause and effect matrix that shows which devices have tripped, it should be also visible which devices did not trip although they should have tripped. This is determined by tracing trip signals and checking information held by each device that received a signal to trip and comparing that with information about whether the device has tripped, or not. If the device was signaled to trip, and did not trip, this status can preferably be indicated in a non-ambiguous manner directly associated to the affected effect cell on the cause and effect matrix.

By this means the device that has tripped can be reached directly from the online view of the cause and effect diagram for operation (and all the other devices on the cause and effect diagram as well).

If a device tripped as it was supposed to do, the cause of that trip is not always obvious to an operator. Therefore, a button or another control feature on the faceplate of the tripped device is provided that brings up information, or subscribes to information already held by the industrial safety system, which will be relevant to what may have caused the device to trip. To get this information, a generic routing algorithm may be used provided that it is configured for trips and interlocks. Furthermore, if a shutdown occurs, a detailed report about that shutdown can be integrated into the online view of the cause and effect matrix so that the operator can access it from there.

If a device has not tripped as it was supposed to do, the reason for that may be of interest to an operator. The status of trip signal sent to device, but device not tripped can be shown directly on an effect cell of the cause and effect matrix. It can also be shown on the faceplate for the device. From a button or another control on the faceplate details of the trip that was signaled are accessible. This information is normally available in the device already and is detected e.g. by a time-out or by an auto-diagnostic routine. For example a valve that should close has a certain amount of time to fulfill that operation. If an end-switch is not reached within that time, a time-out occurs that reports that the valve did not close as expected.

Because shutdown levels are normally entered and/or configured in the cause and effect diagram, the respective shutdown levels required for the control code may also be created automatically with the help of a Cause and Effect Editor tool. The Cause and Effect Editor tool which in general is a control code engineering tool may be an application such as the Control Builder M product or Advant Safety Builder product supplied by ABB with ABB Safeguard Systems. The Cause and Effect Matrix (CEM) editor is used during the design and/or engineering phases, and/or later during commissioning or maintenance/upgrades phases etc. The control code engineering tool accepts a cause and effect matrix as input and transforms it into control code. The control code may be in a form compatible with any of the intermediate code types named in standard IEC 61131-3.

The control code is preferably first compiled into executable/binary code that can be executed in the safety controller, and then downloaded into a process controller (or other safety device) as executable/binary code.

The generated control code can also be structured according to the shutdown levels, and/or Fire Areas or FGS detection/mitigation factors and/or also to other logical constraints.

The Cause and Effect matrix described here and the control code generated from it may be applied to one or more controllers in a safety system, and the online viewer may be used for controlling/monitoring the causes and effects in the cause and effect matrix so as to control and monitor processes in a hazardous installation with a process from any process industry group such as: oil and gas extraction, production, refining, transport, distribution; chemical process, pharmaceutical process, process in an installation for production or processing of pulp and paper.

In another aspect of the invention, an industrial safety system comprising components with inputs and safety devices enabling signals to be generated as a result of an event or alarm, comprising a graphic user interface and an online viewer of a cause and effect matrix is provided, the system comprising a computer, a computer program and a graphical user interface, wherein the Cause and Effect online viewer further comprises one or more applications to generate a link and/or display to show on the CEM when a device has tripped, and/or to provide from the CEM a faceplate for a device linked to a cause or effect cell of the CEM.

In another, further, aspect of the invention, a computer program is described for carrying out the methods according to the invention. In another aspect of the invention a computer program product comprising a computer program for carrying out the method of the invention is described.

BRIEF DESCRIPTION OF THE DRAWINGS

A more complete understanding of the method and system of the present invention may be had by reference to the following detailed description when taken in conjunction with the accompanying drawings which, schematically and only by way of a non-restrictive illustration, represent a practical embodiment of the invention. In the drawings.

DETAILED DESCRIPTION OF THE INVENTION

Figure 1:
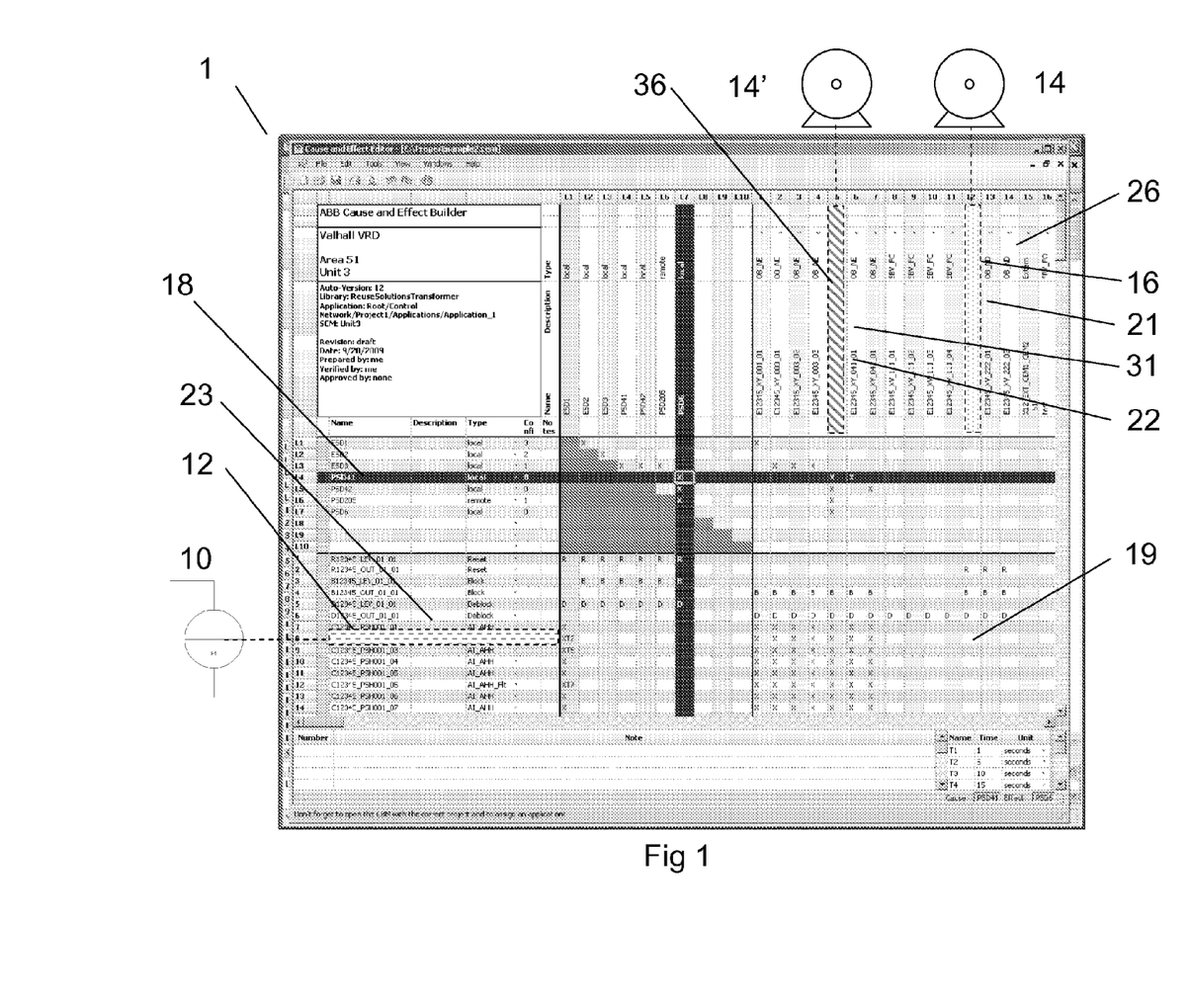
FIG. 1 shows in a simplified block diagram a graphic user interface displaying one possible form for a cause and effect matrix inside a cause and effect editor according to an embodiment of the invention.

FIG. 1 shows elements of a graphical user interface of a cause and effect matrix in a safety system in a simplified diagram. Within an industrial control system the safety system is comprised in the control system and functions as an individual system in parallel with the control system, sometimes even enabling the same action, but with different decision chains.

FIG. 1 shows an embodiment of a user interface of the cause and effect editor tool comprising an online viewer for a cause and effect matrix (CEM). The cause and effect editor may be displayed on a suitable workstation display device and arranged with selection means for input etc. to a human machine interface (HMI). The figure shows a cause and effect matrix with horizontal rows of causes 22 and vertical columns of effects 26. The matrix 1 includes a cause which is preferably represented by a (global) variable 12 and an effect which is preferably represented by another, different (global) variable 16. Alternatively each cause input and each effect output may be identified and represented in the matrix in the form of a function block or other process logic component instead of in the form of a global variable. The global variable, when used, is preferably of the form "<cause-name>_<cause-type>" (in the case of "causes". The global variable in the case of effects is preferably of the form "<effect-name>_<effect-type>".

Thus the Cause and Effect matrix presented in the graphical user interface preferably contains only a number of uniquely identified (global) variables. Each of which (global) variable, in effect, acts as a link to a process logic component representing each different input device or different output device. Thus the intermediate code that represents the cause input device or the effect output device is not present in the matrix, in contrast to known systems. The advantage of this improvement is that the cause and effect matrix itself does not include code to model the particular cause or the effect but instead a global variable, which provides an added flexibility to the user because adaptations may be made. A user can manually add other parameters or other code inserted between the input and output program logic components separately from the cause and effect matrix.

FIG. 1 also shows a group of levels or areas within the process, including levels L1-L5. A shutdown level is a group of causes and effects, grouped together either by process sections or site areas. Each level is denoted by a name such as ESD1, ESD2, ESD3, PSD42; PSD205 (not shown) and so on. The level type in the examples shown is denoted as either Local or Remote. Each level name ESD1, PSD42 etc denotes a part of the shutdown logic. One level 18 is indicated as highlighted in FIG. 1, which is level PSD41, which is a local type of level.

In the on-line view 1 of the cause and effect matrix shown in FIG. 1, a first indicator 21, is shown here as a first shading appearance superimposed over an effect cell 16. The first visual indicator 21 visually indicates the effect cell where a device 14 linked to the effect 16 cell has tripped. Superimposed over another effect cell 36 is shown a second indicator 31 with a second and different visual appearance which indicates to the operator that a device in that effect cell received a signal to trip but has not tripped.

The advantage of displaying on the live-view of the cause and effect matrix which devices have tripped, for example shown by indicator 21, is that this information is visible to an operator or other user straight away, without any necessity for additional graphic object selection or navigation. Thus the operator does not need to know in advance which effects or which devices to check, one-by-one, to find out if any of them have tripped or if any of them have received a trip signal but not tripped. This information can be automatically retrieved from the device itself or alternatively found by a process in the safety system and the result is displayed automatically (or semi-automatically depending on user configuration options). Devices are often arranged as intelligent devices which, amongst other things, run self-diagnostic routines. Thus the device itself normally detects that a trip signal has been received and that the device has not tripped and thus an intelligent device can provide this information.

In addition it is also visible from the cause and effect matrix which devices did not trip although they received a signal to trip and would be expected to trip, shown by the second type of indicator 31 and again immediately visible without further action required from the user. This information is normally available in the device already and may be detected by a time-out or a watchdog etc. E.g. a valve that should close has a certain amount of time to fulfill that operation. If the end-switch is not reached within that time, a time-out occurs that reports that the valve did not close as expected. Further, the second type of indicator 31 displayed on the online view of the cause and effect matrix may be activated by user input such as mouse roll-over or right click etc., to access and display information such as whether a timeout has occurred for a valve or other component operation in the device that has not tripped.

Figure 2:
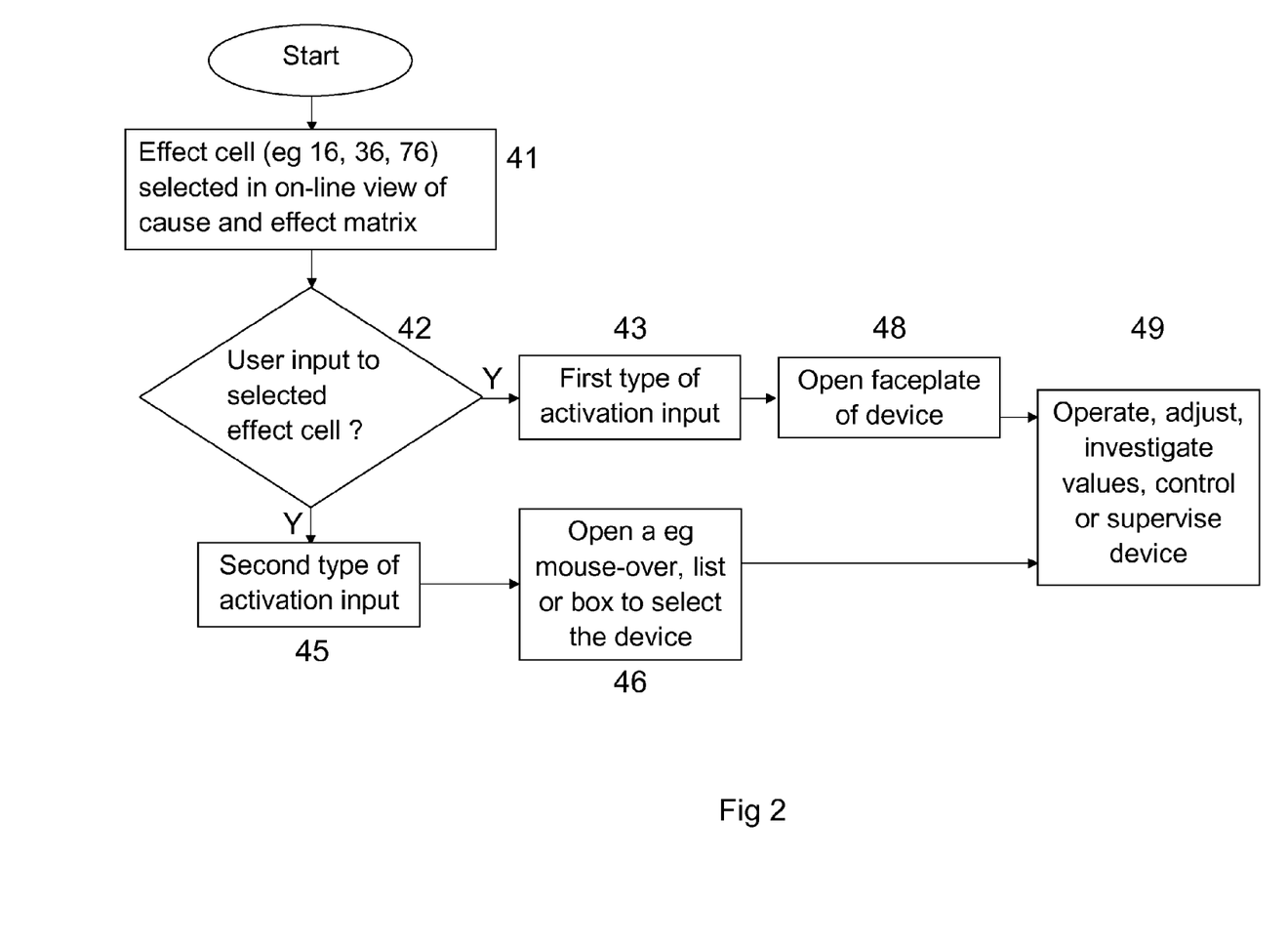
FIG. 2 shows the invention of FIG. 1 and more particular is a flowchart showing a method for carrying out the invention of FIG. 1.

FIG. 2 is a flowchart for a method for displaying firstly a faceplate directly from the online view of the cause and effect matrix. A user can select any effect cell 26 such as any of effects 16, 36 in FIG. 1 and by activating the cell in a first way with, for example, a mouse left click or double left click on cell 16 for example, a faceplate will be opened for the device linked to that cell, in this example a faceplate for device 14. By means of such a faceplate the device can be operated or otherwise controlled.

Secondly, a device can be operated directly from an effect cell it is linked to in the online view of the cause and effect matrix. A user can select a cell such as any of effect cells 16, 36 in FIG. 1 and by activating the cell in another second way, a computer mouse-over or a right mouse-click, for example, a selection such as a pop-up box or drop-down list or other list will be opened (see 40, FIG. 4) so that the user can choose a selection that operates a device linked to the effect cell. In the present example if effect cell 16 was selected then device 14 may be operated. As an alternative to operating the device, further live information about it such as a measured value or values could be retrieved via a pop-up or roll-over function (such as 40, FIG. 4).

The flowchart of FIG. 2 shows the following actions:
41 An effect cell on cause and effect matrix is selected
42 Is a user input detected to the effect cell?
43 If Yes and first type of activation input, then
48. Open faceplate of device linked to the effect cell, and when further input received do 49;
45 If Yes and second type of activation input, then
46. Open a pop-up box, drop-down list, or other selection list, and
49 Operate the device or otherwise control the device or investigate values of the device etc.

Figure 4:
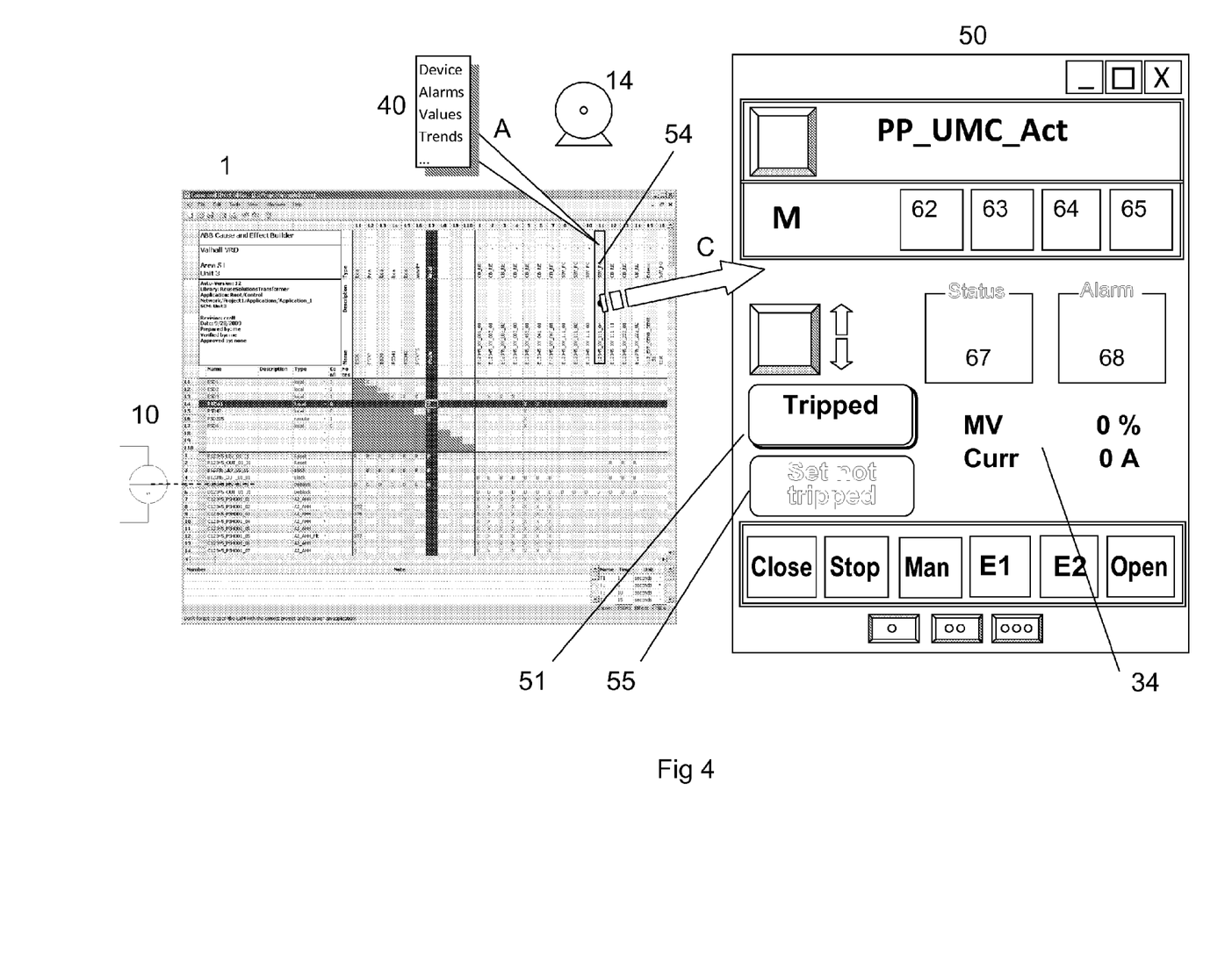
FIG. 4 shows the invention of FIG. 1 and more particularly illustrates the indication of effect cells including a device or actuator for which a trip has been signaled according to an embodiment of the invention.

In FIG. 4 an effect cell 16 is shown in the online view. A popup box 40 or list of selectable functions may be opened A by user input in the form of a mouse pointer roll-over or mouse right-click, or other pre-determined user input action, on the cause cell 16. Thus the indicator 21 or effect cell 16 it is associated with may also be pointed at on the online view e.g. with a mouse pointer to display A and receive short information about which device it is that has tripped in the form e.g. of a mouse roll-over label, or tool-tip. The user may then select an option from a list or similar function in the pop-up 40 to: open the Device, to view an Alarm, access a Value, view a Trend and so on. In this way using popup 40 the user may access a device of a cause cell directly from the online view of the matrix.

FIG. 4 shows in the online view 1 of FIG. 1 a faceplate 50, right side of diagram, and the cause and effect matrix online view 1 in the left side of the diagram. From the live-view 1 of the cause and effect matrix it is also possible to operate the devices using a second set of user actions. The second way to operate the devices is for an operator to activate a link to the faceplate directly from the selected cause cell on the online view of the matrix. A second control (not shown) is linked to an effect cell indicated by reference number 54 which can be activated by an operator input to open a faceplate 50 for the device 14 linked to the effect cell. Activating the second control when the effect cell is in some way selected causes the faceplate to be generated and e.g. displayed as a separate window floating superimposed over the matrix, as shown schematically by the arrow C. For example the cause and effect matrix may be configured so that an input such as a left click or double click on an effect cell in the cause and effect matrix results in generating a faceplate for the device linked to the effect cell.

Thus a faceplate for the device that has tripped can be reached directly from the online view of the cause and effect diagram for operation and investigation (and all the other devices on the cause and effect diagram as well). If then a device tripped as it was supposed to do, the cause of that trip is not necessarily obvious to the operator. Therefore, a button on the faceplate of the tripped device is provided to access information about what caused the device to trip. To get this information, a generic routing algorithm could be used that is configured for trips and interlocks in that case.

Secondly, indication that the device has tripped may also be shown on the faceplate for the device, for example as via indicator 51 on a faceplate for the device (see FIG. 4). If a device e.g. 14 linked to an effect cell e.g. 16 has been signaled or set to trip but has not tripped this status of device signaled but not tripped can firstly be displayed on the online view of the effect cell e.g. as visual appearance 31; and also displayed as an indicator 55 or button on a faceplate for the device.

FIG. 4 shows the online view 1 of the cause and effect matrix of FIG. 1 together with a faceplate 50 for operating or controlling a device such as 14 associated with an effect cell of the cause and effect matrix. The faceplate shown is a reduced faceplate, for controlling a type of motorized control. The word reduced means that the reduced faceplate displays a reduced or limited number of controls and information access controls. Controls such as the buttons 62-65 may respectively be arranged with functions to access via 62 operator notes for the motor, 63 security settings for the motor, 64 measured values for the motor, 65 trend information. Access may also be provided to Alarm lists and/or Event lists for this device.

Live values such as a status indicator or list may be shown such as in a display 67 and/or a list of alarms may be displayed in a display such as 68. The reduced faceplate also shows live values for measured values 34 for a motor such as motor voltage MV showing 0% voltage and motor current Curr showing 0 Amps. A limited set of buttons Close, Stop, Man, E1, E2 and Open are provided for operating the motor.

At the bottom of the faceplate three selectors are provided allowing the user to switch from reduced faceplate, currently selected (left), to standard faceplate (centre) or to extended faceplate (right side of diagram).

In addition to known device controls and information access controls described above that may be arranged on a faceplate, the faceplate according to an aspect of the invention also includes a control for displaying and accessing information about a trip.

FIG. 4 shows a faceplate 50 provided with a control or button 51 which indicates on the faceplate if the device has tripped. If the button 51 is displayed in a usual way, with a signal lamp or colour flash and/or with full colour contrast or shadowing on the button or similar, then that would indicate that the device has tripped. The full contrast display may alternatively be indicated by a filled-in shape such as a filled-in box (See 21,21' in FIGS. 5, 6).

If the button 55 is visually displayed in an alternative e.g. low-contrast way, grayed or without shadowing for example, as in FIG. 4, then this visual indicator 55 shows the user straight away that the device has not tripped. The low-contrast display may alternatively comprise an outline symbol such as a hollow box (See 31', 59 in FIGS. 5, 6).

Pointing at the "Tripped" button 51 with a computer input device or moving a computer mouse pointer on the button activates a mouse roll-over label or similar showing some information about the trip; or, if the Tripped button 51 is not tripped, (not shown), then information about the most recent signal or signals to trip the device may be retrieved instead. Double or single clicking or other activation of button 51 brings up full details on the most recent trip signal or signals, and options to access past trips or other historical data for the device.

Exemplary faceplate 50 is also provided with a separate control or button 55 which indicates if the device has been set to trip, has received a signal to trip, but has not tripped. Similarly if the "not-tripped" button 55 is shown in low contrast, e.g. as grayed and/or without shadow then the device has not been set to trip. This appearance is demonstrated in an exemplary way in FIG. 4 for Button 51, as though it were grayed, and with no extra highlights or shadows, to indicate low contrast, and thus not tripped. If the Not Tripped button 55 is displayed in a usual way, as shown in FIG. 4, meaning with contrast colours and/or shadowing then the device has received a signal to trip. In the same way as described in respect of the first indicator 51, a similar pointing action or mouse roll-over action performed on the second control or button 55 retrieves short information about the trip that was set, but which did not take place. Double or single clicking or similar selective activation of the not tripped control or button 51 brings up full detail on the signal sent to set the device to trip.

This information is found automatically or semi-automatically on command, depending on operator configuration options, by a process in the safety system. The process may for example use a routing algorithm to identify which causes are linked to the effect cell to which the device receiving the trip signal is associated.

Figure 5:
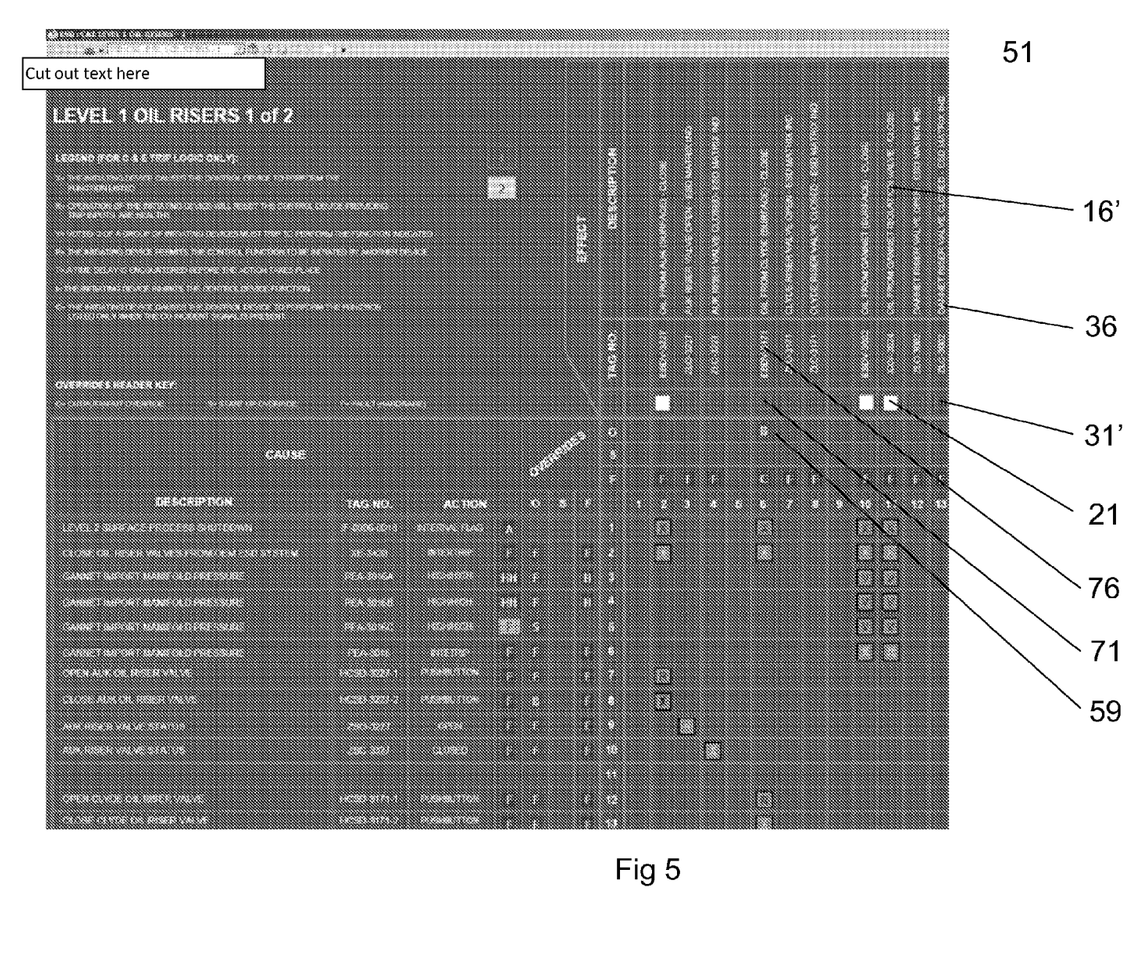
FIG. 5 shows the invention of FIG. 1 and in particular an online view of a cause and effect matrix.

FIG. 5 shows an online view 51 of another cause and effect matrix for safety control of an oil riser in an oil and gas installation. The figure shows 12 causes in horizontal rows 1-13 on the left side of the diagram, and 10 effects arranged in vertical rows 1-13 on the right side of the diagram. An effect 16' with tag number ESDV-3002 and description "Oil from Gannet (surface)—close" is shown with a first visual indicator 21, here in the form of a filled-in white box, which indicates that the device of effect 16' has tripped. The tripped indicator 21 is a live value for a status of the device.

Another effect in effect cell 76 with tag number ESDV-3171 and description "Oil from Clyde (surface) close" is shown with a second visual indicator 71 in the form of an outline of a small box. Second indicator 71 is used to show that the device has had a trip set but that the device has not tripped. In the vertical and horizontal rows marked "Overrides", a marker with the letter "B" with reference number 59 can be seen in row 6 and adjacent to effect cell 76. The marker B in the intersection between horizontal Override row 0 and effect cell 76 shows that there is an override or block preconfigured on that effect which will override any trip that is set. Often the cause and effect logic sets one or more particular blocks to override a trip, especially under particular phases of operation, for example during a process start-up or a shutdown. An operator may also configure an override. So in this case, effect 76 has a trip set but did not trip as shown by second indicator 71. Thus the operator can see at a glance that the trip that was set was blocked by a pre-configured override 59 shown by letter B. Both the block set B and the not tripped indicator 71 are live values showing a current status in the online view for the device linked to effect cell 76.

Figure 6:
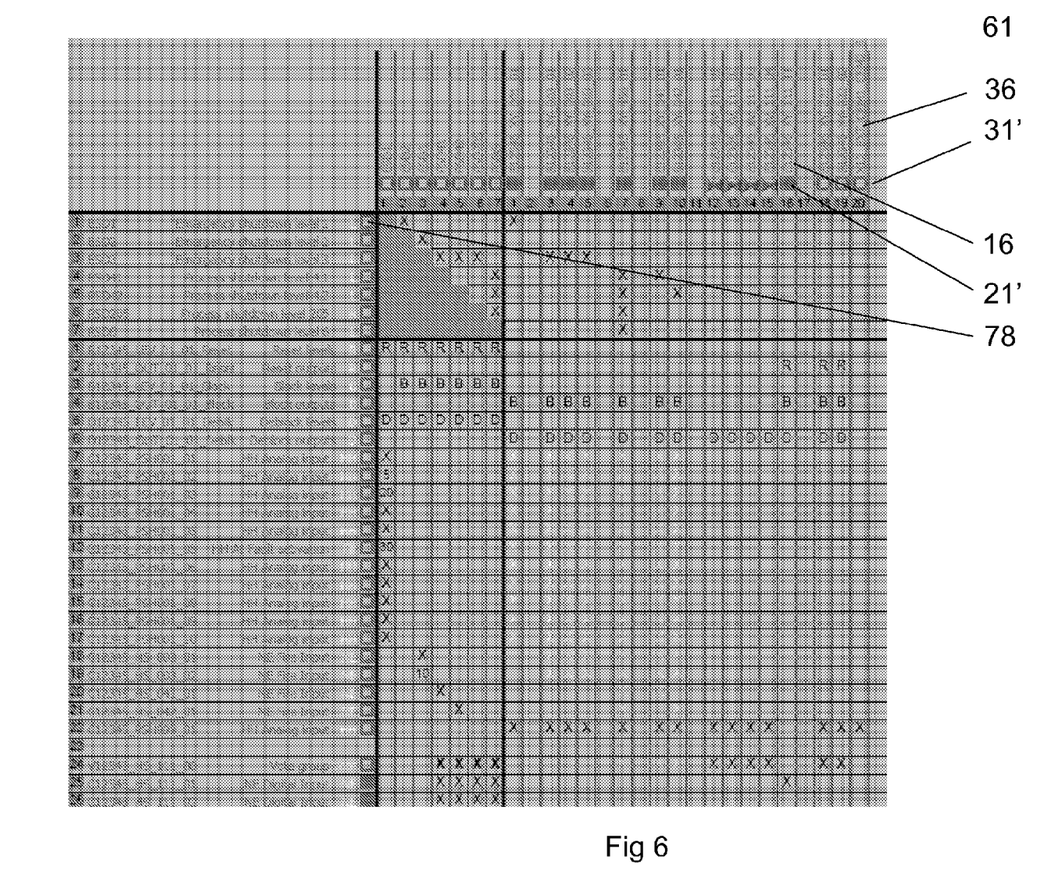
FIG. 6 shows in particular another, further online view of another cause and effect matrix according to another embodiment of the invention.

FIG. 6 shows an online view 61 of another cause and effect matrix for safety control of processes in another part of an oil and gas installation. The figure shows in this view 7 shutdown levels and 26 causes in horizontal rows on the left side of the diagram. The same 7 shutdown levels are shown on the right side of the diagram together with 15 effects in rows 1-20. One effect 16, in row 16, is shown with a first visual indicator 21', here in the form of a small filled-in green box, which indicates that the device of effect 16 has tripped.

Another effect 36 in row 20 of online view 61, with a tag number X12_EXT_CEM1_CEM2_5, is shown with a second visual indicator 36 in the form of an outline of a small box. Second indicator 36 means that the device of effect cell 16 has had a trip set but that the device has not tripped.

A faceplate for a device in FIG. 5 or 6 linked to an effect cell may be opened, displayed and the device operated using the faceplate, in the same way as described in relation to FIG. 1. The faceplate is opened by activating the effect cell with a first type of user input, such as a mouse double-click or a left-click or similar. Also, a device in FIG. 5 or 6 linked to an effect cell may be opened, displayed and the device operated by activating the effect cell with a second type of user input, such as a mouse-over then selection from a pop-up or drop-down; or by a mouse right-click or similar. The device may then be operated or supervised.

A shutdown level may also be operated directly from the on-line view. For example, referring to FIG. 5, a user input on the shutdown level in the online view 51 can open controls to operate the causes or effect in a shutdown level. For example a shutdown level 78 in row 1 with tag number ESD1 and description "Emergency shutdown level 1" may be opened and operated directly from the online view in the same way as an effect.

A shutdown level may also be arranged with a faceplate so that the shutdown level can be "operated" from the online view via a faceplate. Another user input is arranged which, upon activation by a user, opens a faceplate for the shutdown level, just as with an effect cell or a cause cell. The shutdown level 78 may be operated manually from the faceplate opened from the online view just like a device. Configuration data in the shutdown level may be changed. Thus a mouse-click on an input like a temperature will access that temperature input for adjustment etc. A different mouse-click may be used to access sensors or actuators directly from a shutdown level such as 78. For example the override block B such as 59 may be manipulated, e.g. it may be set or removed.

In another embodiment instead of saving the cause and effect diagram as an Excel-sheet or in a database, it is saved in an XML-format. By this means the data can be exchanged more easily among different tools. It can also be stored independently of any Excel or database version and can also be stored very compactly when the XML file has been compacted (e.g. zipped). The XML file can also be made system-wide accessible within an industrial control system so that the Cause and Effect Diagram can be planned from any engineering node in the system and not only from one where it was initially created. There is no need to manually copy the file to another node (PC). In an industrial control system such as the 800xA system from ABB, this can be achieved by placing the cause and effect data in an aspect.

Another embodiment of the safety system includes display devices with sensitive screen materials, touch screens and the like. Touch screens may be arranged to register a touch or a near movement or gesture by electrical (e.g. capacitive) functions or by optical functions (e.g. IR registration, refraction in screen material due to a function of touch pressure) and so on.

In the case where the HMI of the safety system is embodied as a touch screen, text lines or images included in the display of the preferred embodiment, and the select, navigation buttons may each be embodied as images on a touch screen. Monitoring of the operations of one or more of process devices protected by a safety means may be carried out according to the same method but executed by means of touching parts of the screen instead of pressing buttons, or by clicking with a computer mouse or other pointing/selection device. The HMI may be arranged so that two or more user inputs may be received simultaneously either using a single mode, such as a multi-touch screen or by using a plurality of modes such as single screen touch+mouse pointer, single screen touch+computer mouse left-click/right-click or single screen touch+CTRL or other keyboard key. In a particular improvement to facilitate collaboration the Cause and Effect editor graphic user interface may for example be displayed on a collaboration display device such as a horizontal table-like surface around which a number of users may collaborate and operate input devices simultaneously when configuring or testing safety inputs and effects for a safety system.

This invention is applicable in all industrial areas where safety systems are mandated and other areas where introducing mandatory safety system is under discussion.

In advantageous developments the method is further adapted by providing and displaying on the faceplate 50 one or more live process values 34 of the device 14; and/or by providing on the faceplate 50 one or more controls for accessing live 34, 51, 55 and/or historical data 62-68 for the device 14.

In advantageous development of a system comprising an online viewer and cause and effect matrix in a safety system the system comprises a hand-held computing device displaying the cause and effect matrix in a live view arranged with controls for input by one or more users to operate or manipulate the cause and effect matrix; and/or further the hand-held computing device is equipped with a wireless receiver and/or transmitter; alternatively or as well the hand-held computing device is equipped with controls for input by one or more users to the online view of the cause and effect matrix and for accessing a functional faceplate 50 representation for any device 14 configured in or linked to said cause and effect matrix.

Methods of the invention may be supervised, controlled or carried out by one or more computer programs. One or more microprocessors (or processors or computers) comprise a central processing unit CPU connected to or comprised in a safety controller or process controller as described, which processors, PLCs or computers perform the steps of the methods according to one or more aspects of the invention, as described for example with reference to FIG. 2. It is to be understood that the computer programs for carrying out methods according to the invention may also be run on one or more general purpose industrial microprocessors or PLCs or computers instead of one or more specially adapted computers or processors or safety controllers.

The computer program comprises computer program code elements or software code portions that make the computer or processor perform the methods using equations, algorithms, data, stored values, calculations, synchronisations and the like for the methods previously described, and for example in relation to the flowchart of FIG. 2. A part of the program may be stored in a processor as above, but also in a ROM, RAM, PROM, EPROM or EEPROM chip or similar memory means. Some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as a USB memory stick, and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution, and in particular to methods for tracing trips back to causes, without departing from the scope of the present invention as defined in the appended claims.

What is claimed is:

1. A method in an industrial safety system for controlling a process or equipment, said industrial safety system comprising components with inputs and safety devices and
    wherein said industrial safety system uses control code generated by a cause and effect matrix with an automated link between each event or alarm and an effect or an action to be taken upon receipt of an event or alarm signal due to the event in one or more safety controllers, and
    wherein an online viewer provides an on-line view of said cause and effect matrix,
    characterized by
    providing at least one effect cell in an on-line view of the cause and effect matrix with a first control arranged to receive user input and provide an executable link for opening and controlling a device linked to the at least one effect cell, to operate the device directly from an effect cell it is linked to in the online view of the cause and effect matrix.

2. The method according to claim 1, characterized in that the first control is further arranged with an alternative executable link to open and operate the device linked to the at least one effect cell.

3. The method according to claim 1, characterized in that the first control is further arranged to display a first visual indicator superimposed on or beside the at least one effect cell linked to the device in the case where the device has tripped.

4. The method according to claim 1, characterized in that the first control is further arranged to display a second visual indicator superimposed on the cause and effect matrix on or beside an effect cell in the case where the at least one effect cell has received a signal to trip a device linked to the at least one effect cell but the device has not tripped.

5. The method according to claim 1, characterized by running a process for determining which cause or causes have lead to said event or alarm for the device that received a signal to trip, and displaying a third visual indicator indicating the one or more causes on the cause and effect matrix so determined to have lead to the signal to trip.

6. The method according to claim 1, characterized by providing a second control linked to the at least one effect cell of the cause and effect matrix which is arranged to receive input and open and display a faceplate for controlling the device.

7. The method according to claim 6, characterized by displaying, in the case where the device controlled by the faceplate has tripped, another first visual indicator on the faceplate showing that the device has tripped.

8. The method according to claim 6, characterized by providing on the faceplate another second visual indicator for indicating when a trip has been set or signaled but the device has not tripped.

9. The method according to claim 6, characterized by providing on the faceplate a control with a second visual indicator for retrieving details about which input signals, alarms, events caused the trip that was set.

10. The method according to claim 1, characterized by providing the first control further arranged to receive user input and open and display a faceplate for a selected cause cell or a shutdown level.

11. The method according to claim 1, characterized by providing the first control further arranged to receive user input to a selected cause cell or a shutdown level and open and display an instrument, a setting or a device linked to the cell or level for manipulating it.

12. The method according to claim 1, characterized by providing the first control further arranged with the executable link arranged to receive user input that opens a pop-up box, drop-down list or clickable mouse-over tool-tip for opening and controlling a device linked to the at least one effect cell.

13. The method according to claim 1, characterized by running a routing algorithm arranged to calculate which causes or signals have caused a trip to be set for a said event or alarm.

14. An industrial safety system comprising components with inputs and safety devices and wherein said industrial safety system uses control code generated by a cause and effect matrix and stored on non-transitory computer readable media, the system comprising
  a cause and effect matrix with an automated link between each event or alarm and an effect and an action to be taken upon receipt of an event or alarm signal due to the event in one or more safety controllers, and
  said industrial safety system comprising an online viewer providing an on-line view of said cause and effect matrix,
  said industrial safety system comprising
    a computer,
    a computer program stored on non-transitory computer readable media and
    a graphical user interface,
  characterized in that
  at least one effect cell in the on-line view of the cause and effect matrix comprises a first control arranged for receiving user input and providing an executable link for opening and controlling a device linked to the effect cell, to operate the device directly from an effect cell it is linked to in the online view of the cause and effect matrix.

15. The system according to claim 14, characterized by a first control arranged in turn to display a first visual indicator superimposed in the on-line view on or beside the at least one effect cell linked to a device in the case where the device has tripped.

16. The system according to claim 14, characterized by further comprising an application for providing a second control linked to the at least one effect cell of the on-line view which is arranged to receive user input and display a faceplate for controlling the device.

17. The system according to claim 14, characterized by an online viewer for providing an on-line view in which the first control is further arranged to receive user input to a selected cause cell or a shutdown level and open and display a device, a setting or an instrument linked to the selected cell or shutdown level for manipulating the device, setting or instrument.

18. The system according to claim 14, characterized by an online viewer for providing an on-line view in which the first control is further arranged to receive user input and open and display a faceplate for a selected cause cell or a shutdown level.

19. A computer program for controlling safety devices in an industrial safety system said program comprising computer code stored on non-transitory computer readable media which, when fed into a computer, will make the computer carry out a method for controlling a process or equipment,
  said industrial safety system comprising components with inputs and safety devices and wherein said industrial safety system uses control code stored on non-transitory computer readable media and generated by a cause and effect matrix with an automated link between each event or alarm and an effect or an action to be taken upon receipt of an event or alarm signal due to the event in one or more safety controllers, and wherein an online viewer provides an on-line view of said cause and effect matrix,
  characterized by
  providing at least one effect cell in an on-line view of the cause and effect matrix with a first control arranged to receive user input and provide an executable link for opening and controlling a device linked to the at least one effect cell, to operate the device directly from an effect cell it is linked to in the online view of the cause and effect matrix.

20. A computer readable medium comprising a computer program stored on non-transitory computer readable media which when read into a computer or processor will cause the computer or processor to carry out a method in an industrial safety system for controlling a process or equipment,
  said industrial safety system comprising components with inputs and safety devices and wherein said industrial safety system uses control code stored on non-transitory computer readable media and generated by a cause and effect matrix with an automated link between each event or alarm and an effect or an action to be taken upon receipt of an event or alarm signal due to the event in one or more safety controllers, and wherein an online viewer provides an on-line view of said cause and effect matrix,
  characterized by
  providing at least one effect cell in an on-line view of the cause and effect matrix with a first control arranged to receive user input and provide an executable link for opening and controlling a device linked to the at least one effect cell, to operate the device directly from an effect cell it is linked to in the online view of the cause and effect matrix.

* * * * *